United States Patent [19]

White

[11] Patent Number: 5,435,420

[45] Date of Patent: Jul. 25, 1995

[54] THERMAL INSULATING WHEEL SPACER

[75] Inventor: Jay D. White, Galesburg, Mich.

[73] Assignee: Eaton Corporation, Cleveland, Ohio

[21] Appl. No.: 291,379

[22] Filed: Aug. 16, 1994

[51] Int. Cl.$^6$ .............................................. F16D 65/84
[52] U.S. Cl. .................................. 188/264 G; 188/78
[58] Field of Search ................... 188/71.5, 71.6, 73.1, 188/73.37, 78, 250 G, 264 G, 218 A, 18 A; 301/6.1, 6.2; 192/107 R, 107 M

[56] References Cited

U.S. PATENT DOCUMENTS

| 3,301,357 | 1/1967 | Cussons et al. | 301/6.2 |
| 4,830,164 | 5/1989 | Hays | 188/250 G |
| 4,913,266 | 4/1990 | Russell et al. | 188/18 A |

FOREIGN PATENT DOCUMENTS

| 9321457 | 10/1993 | France | 188/264 G |
| 0156731 | 9/1983 | Japan | 188/264 G |

Primary Examiner—Robert J. Oberleitner
Assistant Examiner—Chris Schwartz
Attorney, Agent, or Firm—Loren H. Uthoff, Jr.; Howard D. Gordon

[57] ABSTRACT

A thermal insulating wheel spacer for placement between a vehicle brake drum and a wheel, where the spacer has a plurality of mounting holes formed within a plurality of mounting pads with scallop portions adjacent to each mounting pad. The wheel spacer is assembled in layers of materials having enhanced wear and thermal insulating properties.

6 Claims, 2 Drawing Sheets

FIG I

FIG 2
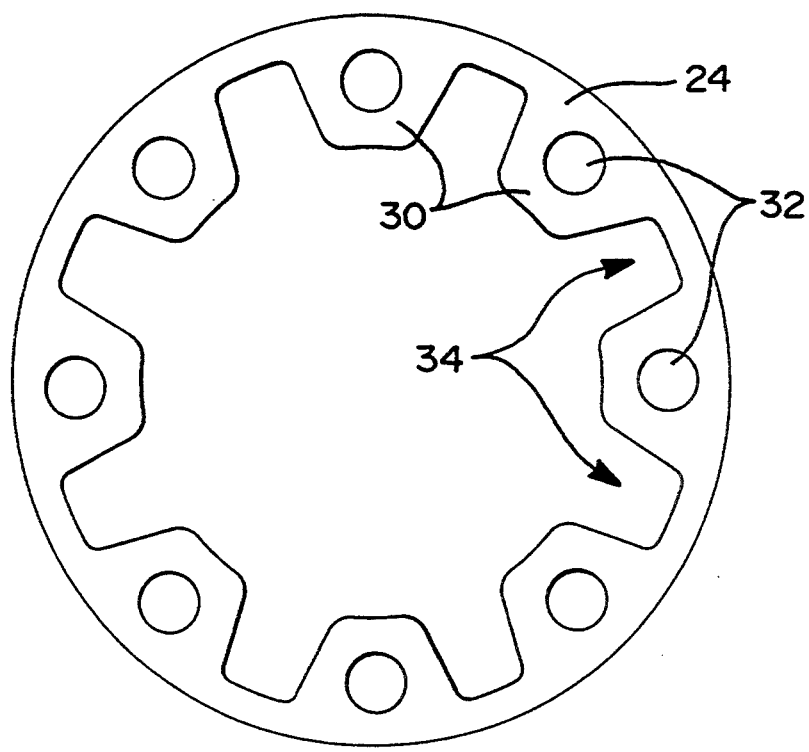
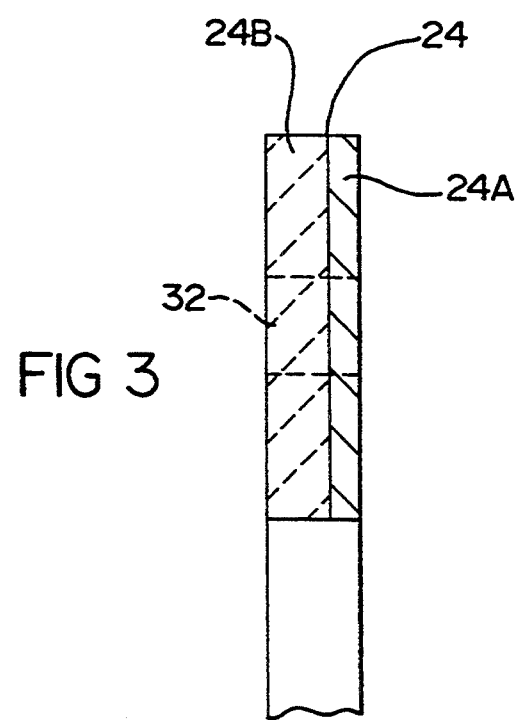
FIG 3

THERMAL INSULATING WHEEL SPACER

BACKGROUND OF THE INVENTION

1. Field of the Invention

The present invention relates to a spacer disposed between a vehicle brake drum and wheel. More particularly, the present invention relates to a wheel spacer disposed between a vehicle wheel and brake drum having thermal insulating properties.

2. Description of the Prior Art

Various prior art methods have been employed to effectively lower the operating temperature of a vehicle wheel and tire assembly to improve service life. A variety of fins and/or channels formed in the surfaces of the wheel and/or brake drum to promote airflow have been devised as a method to increase the rate of thermal convection from the surface of the wheel and/or brake drum into the surrounding air. Examples of these prior art methods can be seen by reference to U.S. Pat. Nos. 2,055,244; 2,998,870; 3,090,114; and 4,536,936, the disclosures of which are hereby incorporated by reference. The purpose of these prior art devices is ultimately to decrease the operating temperature of either the brake drum and/or the vehicle tire to promote longevity when operating in extreme environments. The frictional heating of the brake drum by the brake shoes causes an extreme amount of heat to be transferred not only by convection into the surrounding air but also by conduction through the brake drum flange into the wheel hub and ultimately into the tire. An extreme amount of heat transferred into the tire can cause transformation of the rubber primarily at the wheel/tire interface in an area known as the tire bead. This transformation breaks down the rubber compounds resulting in a shortened service life and possible failure due to air loss at the tire bead.

Many types of prior art air channels and cooling fins have been somewhat effective in an attempt to lower operating temperatures of both the brake drum and/or the wheel/tire. However, none of the prior art devices have been proved entirely satisfactory due to increased costs, complicated fabrication or involved casting processes and/or limited control of heat build-up due to ineffective promotion of airflow.

SUMMARY OF THE INVENTION

The present invention consists of a thermally insulating disc shaped spacer which is inserted between the brake drum and the wheel hub thereby providing for an increased level of thermal resistance to heat flow between the brake drum and wheel especially during extreme braking events. The reduction in heat transfer ultimately results in a lower operating temperature at the tire bead which reduces the level of thermally induced transformation of the rubber compounds found in the tire. Thus, the operating life expectancy of the tire is greatly enhanced by use of the present invention which can be used in conjunction with the prior art airflow control concepts to attain further reductions in the operating temperature of the tire.

The present invention has the advantages of being easily fabricated and installed on a vehicle with significant operating advantages. Fabrication costs are minimized as compared to other prior art devices where complicated castings or fabricated parts have to be attached to the brake drum and/or the wheel.

One provision of the present invention is to provide for a reduction in thermal conductivity between the vehicle brake drum and wheel assembly by inserting an insulating spacer at the interface between the drum and wheel.

Another provision of the present invention is to provide for the reduction of thermal conductivity between the vehicle brake drum and wheel by inserting a thermally insulating spacer having a plurality of insulator scallop portions formed in the insulated spacer thereby providing for a reduction in contact area between the brake drum and wheel.

Still another provision of the present invention is to provide for a reduction in thermal conductivity between the vehicle brake drum and wheel using an insulating spacer fitted between the drum and wheel where the insulating spacer is formed of a plurality of materials having the requisite wear resistance and thermal conductivity characteristics.

DESCRIPTION OF THE DRAWINGS

FIG. 2 is a plan view of the insulating spacer of the present invention taken along lines II—II as shown in FIG. 1; and FIG. 3 is a partial cross-sectional view of an alternate embodiment of the present invention.

DETAILED DESCRIPTION OF THE PREFERRED EMBODIMENT

Figure 1:
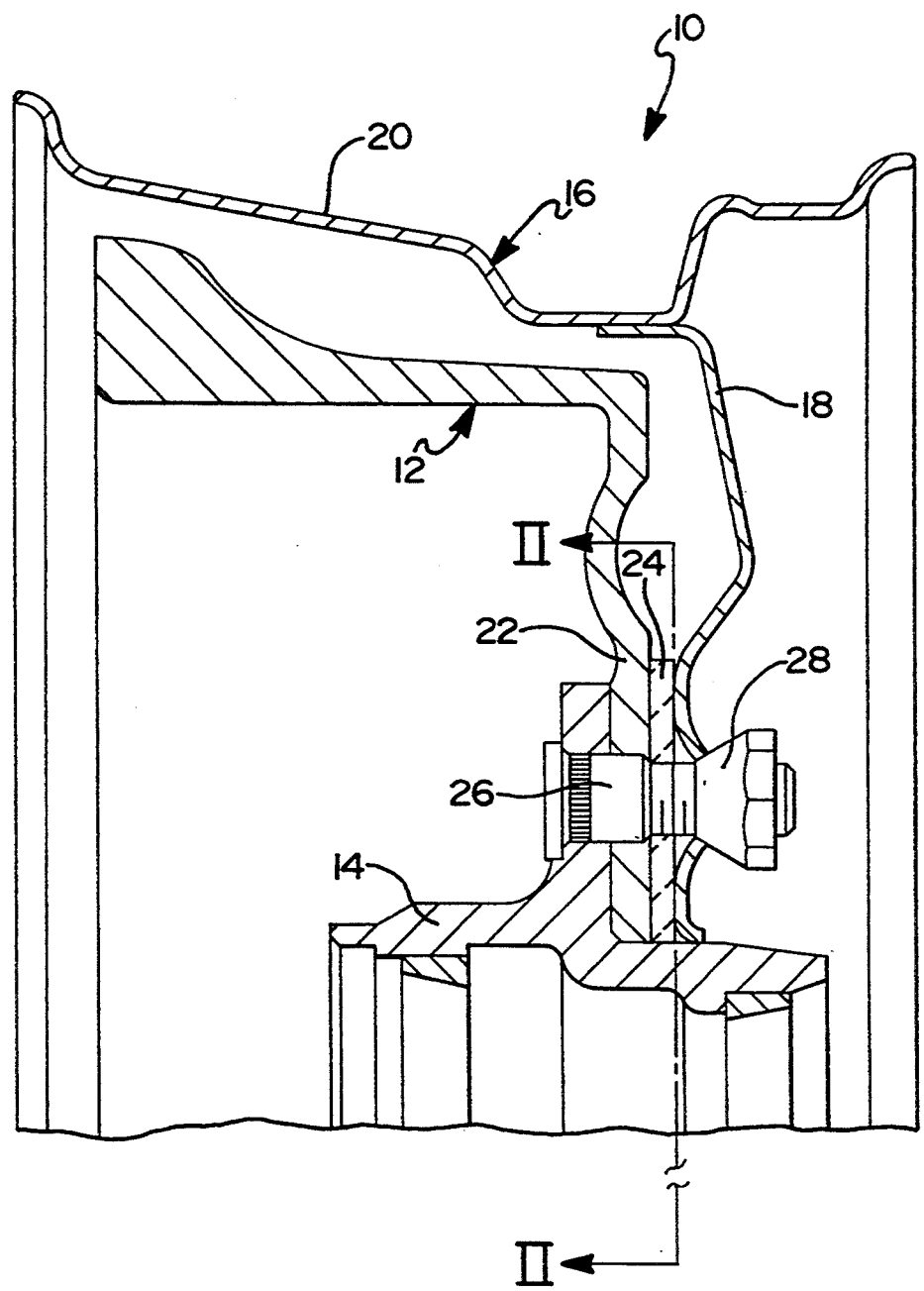
FIG. 1 is a partial cross-sectional view of a wheel mounted to a brake drum using the insulating spacer of the present invention.

In this disclosure, certain terminology will be used for convenience and reference only and will not be limiting. For example, the terms "rightward" and "leftward" will refer to directions in the drawings in connection with which the terminology is used. The terms "inwardly" and "outwardly" will refer to directions toward and away from, respectively, the geometric center of the apparatus being described. The terms "upward" and "downward" refer to directions as taken in the drawings in connection with which the terminology is used. All foregoing terms include normal derivatives and equivalent thereof.

Now referring to FIG. 1, a partial cross-sectional view of the wheel/brake assembly 10 incorporating the present invention is shown. A brake drum 12 is mounted to a vehicle axle hub 14 along with a vehicle wheel assembly 16. The vehicle wheel assembly 16 is comprised of a wheel hub 18 upon which is mounted a wheel rim 20 in a traditional fashion. The wheel hub 18 is mounted to the axle hub 14 along with the brake drum 12 at a drum flange 22 with a heat insulator spacer 24 sandwiched therebetween and secured in position using a plurality of mounting bolts 26 and a like number of wheel nuts 28. The insulator spacer 24 is preferably made of some type of material having a low co-efficient of heat conductivity such as an insulator having a conductance less than 0.4 btu-ft/hr-ft$^2$-°R. Example materials include ceramic and stainless steel.

Now referring to FIG. 2, a plan view of the insulator spacer 24 of the present invention taken along line II—II in FIG. 1 is shown. A plurality of support pads 30, one for each of the mounting bolts 26, are used to support the wheel hub 18. Also shown are a like number of clearance holes 32 for passage of the mounting bolts 26 therethrough.

A plurality of scallop portions 34 which extend adjacent to the support pads 30 are shown where the purpose of the scallop portions 34 is to minimize the contact area between the wheel hub 18 and the brake drum 12 at the drum flange 22 thereby providing for a reduced level of thermal conductivity. The scallop portions 34 are optional and can be eliminated to form a conventional annular disc shape for the insulator spacer 24. The thickness of the insulator spacer 24 can be selected to suit the particular application although, from a thermal perspective, an increase in thickness results in a decrease in heat transfer into the wheel.

Now referring to FIG. 3, a partial cross-sectional view of an alternate embodiment of the present invention is shown where the insulator spacer 24 is fabricated from a plurality of materials (in this case two) each having the required thermal and wear characteristics for the specific vehicle application. For example, fretting between the wheel hub 18 and the insulator spacer 24 could be a problem which can be alleviated with the use of some type of hard material such as stainless steel, for a first layer 24A which forms the surface of the insulator spacer 24 facing the wheel 16. The first layer 24A is bonded to a second layer 24B which is made of a material having a low value of thermal conductivity and faces the drum flange 22. The first layer 24A and the second layer 24B can be selected from a variety of wear resistant and thermal insulating materials. The wear resistant material could be placed to contact the brake drum 12 and/or the drum flange 22. In the alternative, any number of layers of materials could be used to fabricate the insulating spacer 24 to produce the required properties.

The description above refers to particular embodiments of the present invention and is understood that many modifications may be made without departing from the spirit thereof. The embodiments of the invention 30. disclosed and described in the above specification and drawings are presented merely as examples of the invention. Other embodiments, materials, forms and modifications thereof are contemplated as falling within the scope of the present invention only limited by the claims as follows.

I claim:

1. A thermal insulating spacer for placement between a vehicle brake drum and a wheel where said wheel is secured to said brake drum by a plurality of mounting bolts, said spacer having a first surface contacting said brake drum and a second surface contacting said wheel and a substantially uniform thickness between said first and second surfaces, said spacer having a plurality of mounting holes formed therein for passage of said mounting bolts therethrough and scallop portions formed adjacent to each of said mounting holes.

2. The thermal insulating spacer of claim 1, wherein said wheel spacer is comprised of a plurality of layers of selected materials having a substantially uniform thickness bonded together.

3. The thermal insulating wheel spacer of claim 2, wherein said plurality of layers are comprised of a first layer formed out of a stainless steel and a second layer formed out of an insulating ceramic.

4. A thermal insulating spacer for placement to thermally separate a vehicle brake drum from a wheel secured together with a plurality of mounting bolts, said spacer having a plurality of mounting pads formed to surround a like number of mounting holes, one for each of said mounting bolts passing therethrough and having a first surface contacting said brake drum and a second surface opposite and parallel to said first surface contacting said wheel.

5. The thermal insulating spacer of claim 4, wherein said spacer is made of a stainless steel.

6. The thermal insulating spacer of claim 4, wherein said spacer is made of a plurality of layered and bonded materials.

* * * * *